United States Patent [19]
Rodgers

[11] 3,878,457
[45] Apr. 15, 1975

[54] THIN FILM THICKNESS MEASURING APPARATUS USING AN UNBALANCED INDUCTIVE BRIDGE

[76] Inventor: Wayne E. Rodgers, 1523 Princeton, Apt. 6, Santa Monica, Calif. 90404

[22] Filed: Nov. 16, 1973

[21] Appl. No.: 416,686

[52] U.S. Cl. .......................................... 324/34 TK
[51] Int. Cl. ............................................ G01r 33/12
[58] Field of Search ......... 324/34 TK, 40, 41, 34 D, 324/34 PS, 34 R

[56] References Cited
UNITED STATES PATENTS
2,629,004   2/1953   Greenough ........................ 324/34 R
3,491,289   1/1970   Petrini ................................ 324/40

Primary Examiner—Robert J. Corcoran
Attorney, Agent, or Firm—Charles H. Schwartz

[57] ABSTRACT

An apparatus and method for measuring the thickness of thin films on a nondestructive basis using an inductive bridge operating in its linear portion of unbalance and with an offsetting potential summed with the output of the bridge and with the bridge being fed with a precise amplitude and frequency signal. The instrument is calibrated relative to a first known thickness and then succeeding measurements of thin films are related to this known thickness.

16 Claims, 2 Drawing Figures

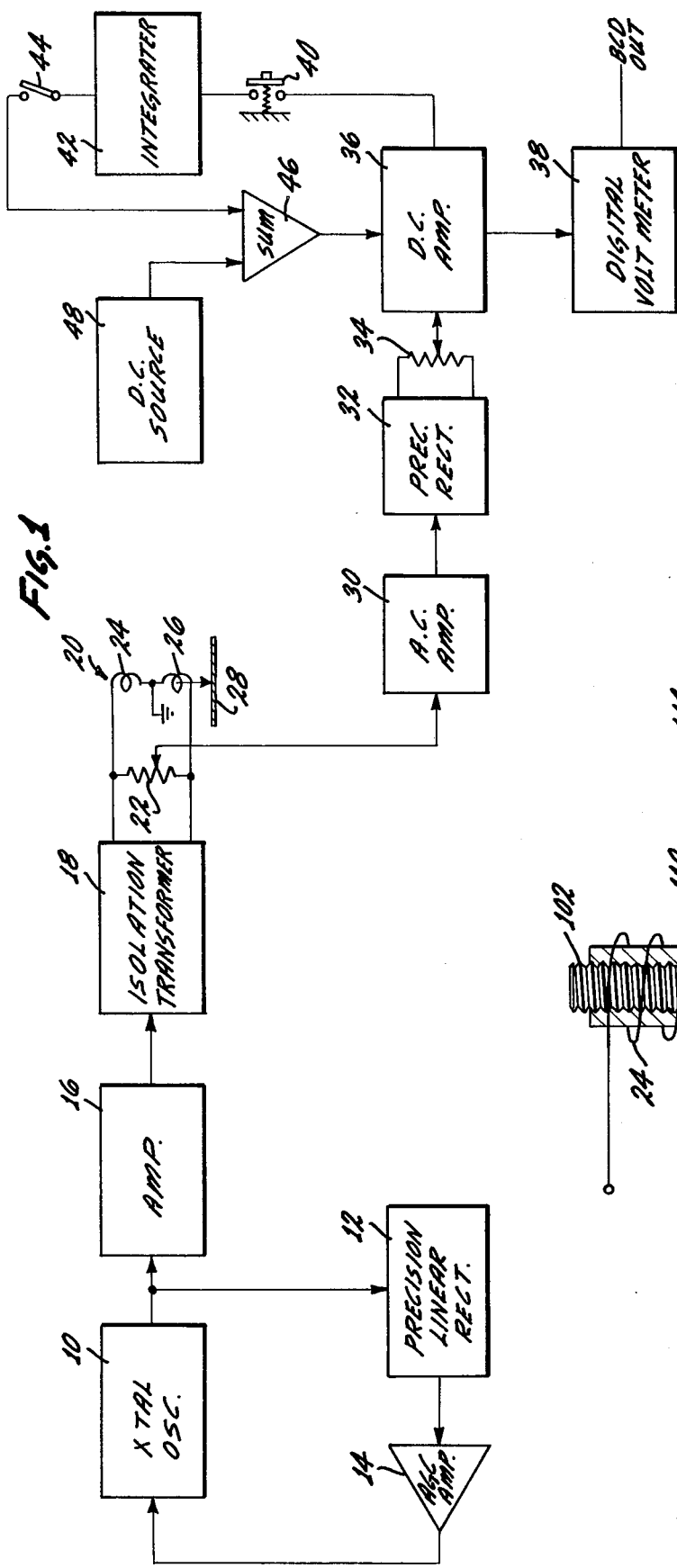
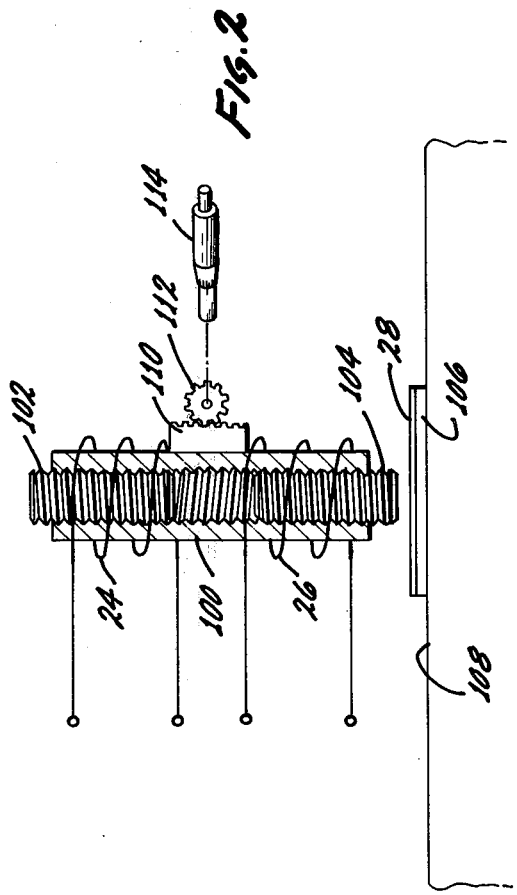

THIN FILM THICKNESS MEASURING APPARATUS USING AN UNBALANCED INDUCTIVE BRIDGE

The present invention is directed to an apparatus and method using an inductance bridge for measuring the thickness of thin films such as thin metallic films deposited on a substrate. These thin deposited films are used in microcircuitry such as for integrated circuits but such thin films have uses other than in electronics. The invention, however, is not limited to the measurement of thin film used for electronics, but to the measurement of the thickness of any thin film of conductive material such as thin films on the order of 10 angstroms to 100,000 A.

There have been prior art attempts to measure the thickness of materials by the use of an inductance bridge wherein conductive material is positioned to interact with one coil of the bridge to change impedance in accordance with the thickness of the material so as to provide an indication of the thickness of the material. However, these prior art devices were primarily useful for measuring relatively thick materials, since these devices were used to either monitor the flow of sheet material or determine whether there was a flaw in conductive material. These prior art devices were not used to measure the thickness of deposited thin films.

Since the prior art devices were primarily designed to make gross measurements compared to the present invention, these devices would have several disadvantages if used to measure thin films. For example, the inductance bridge of the prior devices is powered by an ac oscillator, but since the measurements are relatively gross, the oscillators are inaccurate for use in measuring thin films. In addition, prior art devices have relatively poor control of the amplitude and frequency of the output signals from the oscillator. Prior art devices also provide relatively poor linearity in the rectification of the output signal from the bridge and generally have a non-linear output, as opposed to a linear output of the present invention. Other disadvantages with the prior art devices are variations in the output signal with temperature. These temperature variations are relatively small compared to variations caused by actual variations in thickness so that the prior art devices did not provide for correction for temperature.

Since the prior art devices could not provide for accurate measurement of thickness using the inductive bridge technique, the industry has turned to the use of destructive techniques, wherein a selected number of deposited thin film out of each batch are chosen and are subjected to destructive techniques for providing a measurement of the thickness.

The present invention overcomes the disadvantages of the prior art devices and provides for the measurement of the thickness of thin films such as conductive films, ranging between 10 to 100,000 A. The present invention provides for measurements of thickness using a stable device having high accuracy and repeatability and which is linear in its output reading and which is nondestructive.

The present invention provides for this accuracy in measuring the thickness of thin films by using an inductive bridge fed by a very precise oscillator having a feed-back circuit to provide for high accuracy in the amplitude and frequency of the output from the oscillator. The present invention also reduces inaccuracies due to changes of temperature by locating the inductive elements of the bridge close together so that the temperature changes affect these inductive elements equally.

The apparatus and method of the present invention also provides for the instrument to be calibrated using a first thin film which is either known to have a particular thickness or which is known to provide for the proper operation in its ultimate use and with all subsequent thin films measured relative to this first thin film. The output reading of all the subsequently measured thin films can either be a direct reading of thickness or can be a reading of the thickness relative to the calibrating first thin film.

The present invention also does not provide for the measurement of the thickness of the thin film by nulling the inductance bridge. The bridge is deliberately maintained in an unbalanced state so that changes in thickness provide linear changes in the output of the bridge. The output of the bridge is summed with an offsetting potential to provide a zero output indication when there is no thin film in proximity to the coil.

It is to be appreciated that in addition to the measurement of the thickness of the thin film, the present invention may also provide an output signal which could be used to directly control external equipment to provide for control of the actual deposition of the thin film on the substrate. Also, the output reading of the present invention may be used to control external equipment which could provide for automatic sorting of the deposited thin films after the measurement of the thickness.

A clearer understanding of the invention will be had with reference to the following description and drawings wherein FIG. 1 illustrates a block diagram of an apparatus for providing a measurement of the thickness of a thin film according to the present invention and FIG. 2 illustrates a mechanism for providing adjustment of the inductive portion of the bridge relative to a thin film.

In the block diagram of FIG. 1 a crystal controlled oscillator 10 provides an output signal such as a 50 kilohertz signal which is highly accurate in frequency. The output from the crystal oscillator 10 is applied to a precision linear rectifier to produce a dc signal in accordance with the amplitude of the output of the crystal oscillator. The output from the precision linear rectifier 12 is applied to an automatic gain-control amplifier 14 to produce an output signal relative to a fixed level so that the output of the automatic gain-control amplifier 14 may be fed back as an error signal to the crystal controlled oscillator 10. The feedback loop in combination with the crystal controlled oscillator 10 provides for an input signal to the amplifier 16 which is highly precise both in amplitude and frequency. The amplifier 16 provides amplification of this precise frequency and amplitude signal and the output of the amplifier is connected to an isolation transformer 18 for coupling to an inductance bridge 20.

The inductance bridge 20 includes a potentiometer 22 and a pair of coils 24 and 26. The coil 24 is used for reference and the coil 26 is used to sense the thickness of a thin film 28 located in proximity to the sensing coil 26. This may be seen more clearly with reference to FIG. 2 wherein the coil 24 and the coil 26 are shown as wound on a support member 100. A pair of adjustable cores such as ferrite cores 102 and 104 are shown threaded within the support member 100 and the cores 102 and 104 are used to provide for adjustment of the inductance of the windings 24 and 26 so as to balance these windings when there is no conductive material in proximity to the winding 26.

The thin film 28 is shown deposited on a substrate 106 and the thin film 28 is maintained adjacent to the winding 26 by placing the substrate 106 on a precision surface 108, made of a nonconducting material such as a plastic material.

In order to provide for the coil 26 being positioned accurately relative to the thin film 28, an adjusting means including a rack 110 mounted on the support member 100 and a pinion 112 controlled by a knob 114 are used to move the support member 100 and therefore the coil, 26 in a vertical direction. The knob 114 may also control a dial indicator so that as the support member 100 is moved vertically the dial indicator provides an output indication of the position of the coil 26. For example, the film 28, as deposited on a substrate 106 may be placed on the precision surface 108 and with the coil 26 positioned by the rack and pinion considerably above the surface 108. The coil 26 may then be lowered by the rack and pinion mechanism to just touch the surface of the thin film 28 and then backed off slightly to allow for free movement of the thin film under the coil 26. After the initial measurement of the thin film 28 is made, subsequent thin films may be positioned beneath the coil 26 to provide for comparative measurements with the first thin film measured.

Returning now to FIG. 1, the output of the inductance bridge 20 is taken from the movable arm of the potentiometer 22 and applied to an ac amplifier 30. The output of the ac amplifier is rectified by a precision rectifier 32 and applied to a potentiometer 34 which provides for calibration of the gain in a manner to be explained. The output of potentiometer 34 is taken from the movable arm and applied as a first input to a dc amplifier 36. A first output of the dc amplifier 36 is applied to a digital voltmeter 38 to provide an output indication of the thickness of a thin film in proximity to the sensing coil 26. A second output from the dc amplifier 36 may be applied through a spring biased normally open switch member 40 to an integrator 42. The output from the integrator 42 may be coupled through a switch 44 as a first input to a summing circuit 46. A second input to the summing circuit 46 is from a dc source 48 which provides a fixed voltage of a constant level. The output from the summing circuit 46 is applied as a second input to the dc amplifier 36. The integrator 42 includes a low leakage capacitor which operates to provide a fixed voltage output at a level in accordance with the level to which the capacitor has been charged.

The operation of the thin film measuring device of the present invention is as follows. Assuming first that no thin film is located adjacent to the coil 26, and with the switch 44 in the open position and with the switch 40 maintained in the open position by its spring bias. At that time, the potentiometer 22 is adjusted to be relatively close to a zero output reading on the digital voltmeter 38. However, it is not necessary for the potentiometer 22 to be adjusted to be exactly zero since that is difficult to do manually. The reading may be considerably different from zero and for example, the potentiometer may be adjusted to provide a reading of 20 A if we are to measure a thin film having a thickness in the range of 200 A.

It is to be appreciated that because of the offset voltage provided by the dc source 48 to the dc amplifier 36 through the summing circuit 46, the adjustment of the potentiometer 22 to provide an output reading by the digital voltmeter 38 of a number somewhat close to zero does not indicate that the bridge is actually in balance.

In fact, the bridge 20 is considerably out of balance due to this offsetting voltage and this provides that the changes in the state of unbalance of the bridge 20 are in a linear portion of such changes. Normally, the output voltage from an inductance bridge as it approaches the null point when the bridge is balanced experiences a fair degree of non-linearity. The bridge at the extremes of unbalance also produces a nonlinearity output. The offsetting voltage is therefore chosen to provide for the bridge operating in the linear portion of the amplitude of the output signal versus the unbalance of the bridge.

Once the potentiometer 22 has been adjusted to be near zero as indicated above, then the switch 40 is pushed to provide an input to the integrator 42 in accordance with the output from the dc amplifier which represents the error between the adjustment of the potentiometer 22 and a perfect adjustment of zero. The low leakage capacitor within the integrator 42 stores this error signal. When the switch 40 is released and the switch 44 closed, then the summing circuit 46 applies the error signal to the dc amplifier 36 from the integrator 42. The error signal compensates for the difference between the adjustment of the potentiometer 22 and a perfect zero adjustment. The digital voltmeter 38 is now zeroed so that the instrument is ready to receive a thin film to provide a measurement of the thickness of the thin film.

A reference thin film having a known thickness is now positioned as shown in FIG. 2, on the precision surface 108. The substrate 106 on which the thin films are deposited are generally quite accurate and of course the thickness of the reference thin film is known. The coil 26 is then adjusted by the rack and pinion in accordance with the reading from the dial indicator to provide for the coil 26 to be a known distance above the thin film 28 so that the thin film 28 is approximately in the middle of the eddy current field emanating from the coil 26. The magnetic field generally radiates a particular distance from the sensor and the thin film merely has to be within this fied. This adjustment is within the range of the micrometer adjustment of the rack and pinion.

The gain calibration potentiometer 34 is then adjusted to provide an output reading on the digital voltmeter 38 equal to the known thickness of the thin film 28. The instrument has now been calibrated and adjusted to provide for an output reading on the digital voltmeter 38 representing a particular known thickness and in order to read succeeding thin films having similar thicknesses is only necessary to position these succeeding thin films under the coil 26 and directly read on the digital voltmeter 38 the thickness of these succeeding thin films.

If, for example, the thin films to be measured were used as part of an integrated circuit it would be possible to take one of the integrated circuits which is operating properly and to measure the thickness of the deposition of the thin film forming part of the integrated circuit. This measurement could be made using the instrument of the present invention and adjusting the output of the digital voltmeter to read a nominal number such as 100. All succeeding thin films used to make the integrated circuits may then be positioned within the instrument and the thicknesses observed relative to the reading of 100. It may be also possible to determine that when the reading is either above or below the nominal number of 100 a predetermined amount, then the thin films when made into integrated circuits would not provide the proper performance and that a range of numbers can be established which would provide for proper thicknesses of the thin films. It can be seen therefore that the thickness of all of the thin films may be determined without destroying a large quantity as with the prior art methods, and without constructing integrated circuits from thin films of improper thickness.

The present invention therefore provides an accurate apparatus and method of measuring the thickness of thin films and provides for this measurement on a nondestructive basis using an inductive bridge operating in its linear portion of unbalance and with an offsetting potential and being fed with a precise amplitude and frequency signal. The measurement is accomplished by calibrating the instrument relative to a first known thickness and then relating succeeding measurements to this known thickness. Though the invention has been described with reference to a particular embodiment, it is to be appreciated that other adaptations and modifications may be made and the invention is only to be limited by the appended claims.

I claim:

1. An apparatus for measuring the thickness of a thin film including;
    an inductance bridge having input and output terminals and including at least one reference coil and one sensing coil for sensing the thickness of a thin film located within a magnetic field produced by the sensing coil in accordance with a change in potential of output signals at the output terminals of the bridge and with the bridge including means for maintaining the bridge in an unbalanced state by adjustably controlling the potential of the output signals at the output terminals;
    a source of ac drive signals coupled to the input terminals of the inductance bridge;
    a source of offsetting potential coupled to the output signals from the bridge for providing a constant offset in the potential of the output signals for providing a zero potential for the combination of the output signal and the offsetting potential when no thin film is located within the magnetic field produced by the sensing coil;
    the source of offsetting potential includes a first input of fixed voltage of a constant value and a second input of fixed voltage having a value substantially equal to the difference between zero and the potential of the output signal less the first fixed voltage after adjustment by the means to adjustably control the output signal from the bridge, and
    indicator means responsive to the offset output signals to provide output indications in accordance with the unbalance of the inductance bridge representing the thickness of a thin film under measurement.

2. The apparatus of claim 1 wherein the source of ac drive signals includes a crystal controlled oscillator having a feedback loop for correcting amplitude errors in the ac drive signals.

3. The apparatus of claim 1 wherein the second input of fixed voltage is produced by an integrating means responsive to the input to the indicator means.

4. The apparatus of claim 1 additionally including means to calibrate the output indication in accordance with a thin film of known thickness located adjacent to the sensing coil.

5. The apparatus of claim 1 additionally including means to provide relative movement between the sensing coil and a thin film to be measured.

6. An apparatus for measuring the thickness of a thin film including:
    a sensing coil for sensing the thickness of a thin film located within a magnetic field produced by the sensing coil in accordance with a change in inductance of the sensing coil,
    means responsive to the inductance of the sensing coil for producing an output signal in accordance with the inductance of the sensing coil,
    means for adjustably controlling the potential of the output signal,
    a source of ac drive signals coupled to the sensing coil,
    a rectifier responsive to the output signal for rectifying the output signal for providing a dc output signal having an amplitude in accordance with the inductance of the sensing coil,
    a source of dc offsetting potential coupled to the dc output signal for providing a constant offset in the potential of the dc output signal for providing a zero potential for the combination of the dc output signal and the dc offsetting potential when no thin film is located with the magnetic field produced by sensing coil,
    the source of dc offsetting potential includes a first input of fixed voltage of a constant value and a second input of fixed voltage having a value substantially equal to the difference between zero and the potential of the dc output signal less the first fixed voltage after adjustment by the means to adjustably control the output signals, and
    indicator means responsive to the offset dc output signal to provide output indications in accordance with the inductance of the sensing coil representing the thickness of a thin film under measurement.

7. The apparatus of claim 6 wherein the source of ac drive signals includes a crystal controlled oscillator having a feedback loop for correcting amplitude errors in the drive signals.

8. The apparatus of claim 6 wherein the second input of fixed voltage is produced by an integrating means responsive to the input to the indicator means.

9. The apparatus of claim 6 additionally including means to calibrate the output indication in accordance with a thin film of known thickness located adjacent to the sensing coil.

10. The apparatus of claim 9 additionally including means to provide relative movement between the sensing coil and a thin film to be measured.

11. A method of measuring the thickness of a thin film using an inductance bridge having input and output terminals and having at least one reference coil and one sensing coil for sensing the thickness of a thin film located within a magnetic field produced by the sensing coil in accordance with a change in potential of output signals at the output terminals of the bridge and including the following steps, coupling an ac drive signal to the input terminals of the inductance bridge;

producing an offsetting potential by summing a first fixed voltage of a constant value and a second fixed voltage having a value substantially equal to the difference between zero and the potential of the output signal less the first fixed voltage, summing the offsetting potential with the output signals from the bridge to provide a constant offset in the potential of the output signals to provide a zero potential in the output signal when the bridge is unbalanced and when no thin film is located within the magnetic field produced by the sensing coil, positioning a thin film adjacent to the sensing coil to change the unbalance of the bridge, and providing output indications in accordance with the unbalance of the inductance bridge representing the thickness of the thin film under measurement.

12. The method of claim 11 wherein the step of poritioning the thin film includes the steps of initially positioning a thin film of known thickness to provide calibration and then positioning a thin film of unknown thickness to provide measurement.

13. The method of claim 11, wherein the step of positioning the thin film includes providing relative movement between the sensing coil and the thin film.

14. A method of measuring the thickness of a thin film using a sensing coil for sensing the thickness of a thin film located within a magnetic field produced by the sensing coil and including the following steps;

coupling an ac drive signal to the sensing coil, producing an output signal in accordance with the inductance of the sensing coil, rectifying the output signal to provide a dc output signal, producing a dc offsetting potential by summing a first fixed dc voltage of a constant value and a second fixed dc voltage having a value substantially equal to the difference between zero and the potential of the dc output signal less the first fixed dc voltage, summing the dc offsetting potential with the dc output signal to provide a constant offset in the potential of the dc output signal to produce a zero potential in the summed dc output signal when no thin film is located within the magnetic field produced by the sensing coil, positioning a thin film adjacent to the sensing coil to change the inductance of the sensing coil, and providing output indications in accordance with the inductance of the sensing coil representing the thickness of the thin film.

15. The method of claim 14, wherein the step of positioning the thin film includes the steps of initially positioning a thin film of known thickness to provide calibration and then positioning a thin film of unknown thickness to provide measurement.

16. The method of claim 14 wherein the step of positioning the thin film includes providing relative movement between the sensing coil and the thin film.

* * * * *